M. KRICKL.
SCREW FOR FASTENING STAIR-CARPET.
No. 6,859. Reissued Jan. 18, 1876.
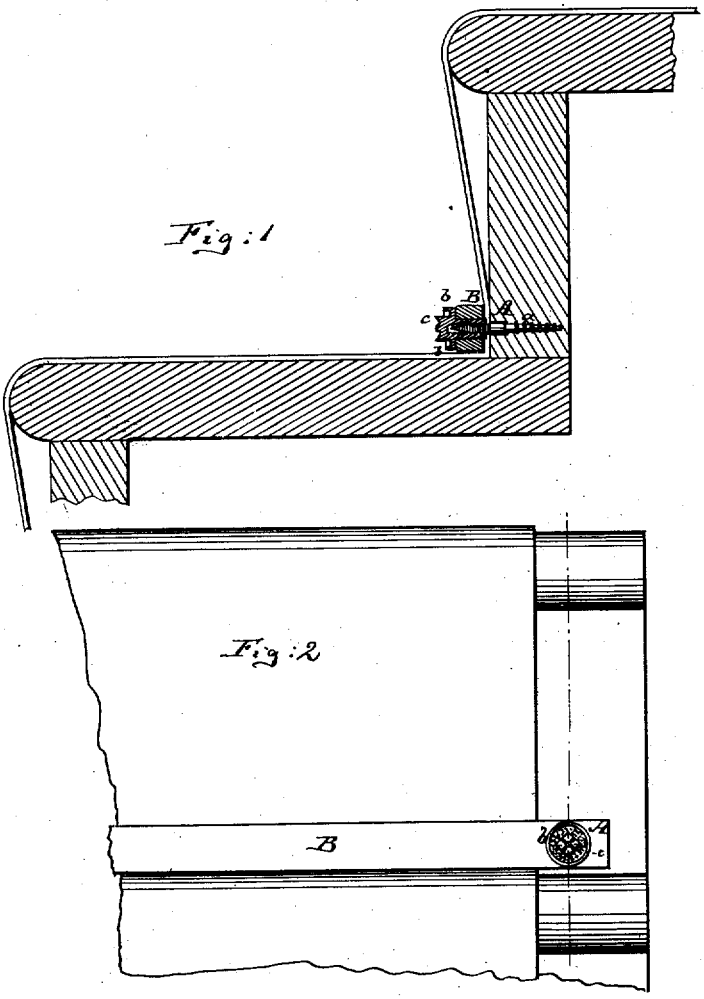
Witnesses
A. Moraga.
Ernest Ellett
Inventor:
M. Krickl
by his attorney
Chas. Briesen

UNITED STATES PATENT OFFICE.

MORITZ KRICKL, OF NEW YORK, N. Y.

IMPROVEMENT IN SCREWS FOR FASTENING STAIR-CARPETS.

Specification forming part of Letters Patent No. 152,387, dated June 23, 1874; reissue No. 6,859, dated January 18, 1876: application filed November 22, 1875.

DIVISION B.

*To all whom it may concern:*

Be it known that I, MORITZ KRICKL, of the city of New York, county and State of New York, have invented an Improved Stair-Carpet Fastener, of which the following is a specification:

The object of this invention is to produce a stair-carpet fastener, by the use of which the expensive stair-rods may be dispensed with, but which may, nevertheless, also be used as a stair-rod fastener.

The invention consists in the production of a sectional carpet-fastener, made in form of a pin, with a removable head, as hereinafter more fully described.

In the accompanying drawing, Figure 1 is a vertical section of part of a stair-case, showing my improved fastener in longitudinal section. Fig. 2 is a face view thereof.

Similar letters of reference indicate corresponding parts in both figures.

The letter A represents my improved sectional stair-carpet fastener. It is composed of a pin, *a*, and a head, *b*. The pin *a* has its outer end threaded to fit a female screw-thread formed in the hollow of the head *b*. The hollow does not extend entirely through the head, but far enough into it as to cause the head, when screwed upon the pin, to be firmly connected thereto. The outer face of the head *b* has a wrench-gripe, *c*, formed upon it, so that the head may be conveniently unscrewed from and screwed upon the pin. If desired, a stair-rod may be placed between the carpet and the heads of the screws.

When my improved stair-carpet fastener is to be used, it is passed through the carpet C into the stair-riser until the head *b* bears against the carpet.

An additional advantage is obtained by pointing the outer ends of the pins *a*, as thereby the carpet, after it has been taken up, can be readily replaced on the pins without tearing holes through it, and without requiring the withdrawal of the pins from the riser—that is to say, when the carpet is to be taken up, the heads *b* are simply unfastened from the pins *a*, the carpet is taken off, and then easily replaced over the pointed projections of the pins, whereupon the heads *b* are reapplied. If desired, a stair-rod, B, may be placed between the carpet and the heads *b* on each riser; but it will be readily seen that the carpet is retained solely by the said fasteners.

When my improved fastener is to be used in conjunction with stair-rods, the heads *b* are provided with prolonged shanks, that extend into sockets in the stair-rods.

Previous to my invention the tacks or pins used for fastening stair-carpets were always rigidly attached to their heads, so that the pin parts would come off whenever the head was removed; but by leaving the pins in the risers after withdrawing the heads, I am enabled to properly and readily replace the carpet on the pins, and to reapply the heads to the ends of the pins that protrude through the carpet.

I am aware that, previous to my invention, picture-nails were provided with removable heads; but said heads were made of two or more pieces, one piece being usually glass or porcelain, and were, therefore, of a nature which rendered it necessary to drive each nail without the head, and afterward apply the head. But the head of my carpet-fastener is made of one piece of metal, and the fastener so constructed that it will be driven home with the head on, the head to be removed only when the carpet is to be taken off.

I claim as my invention—

1. A sectional stair-carpet securer, composed of the threaded pin *a* and of the threaded head *b*, the head being made of metal, to remain on the pin when the fastener is driven into the stair-case, substantially as specified.

2. The combination of the screw-head *b*, which has the wrench-gripe *c* on the outer face, and the threaded cavity on the inner side, with the threaded pin *a* of a carpet-fastener, substantially as specified.

M. KRICKL.

Witnesses:

ERNEST C. WEBB,

A. MORAGA.